(No Model.)
G. WOLVERTON.
PLOW.
No. 371,908. Patented Oct. 18, 1887.
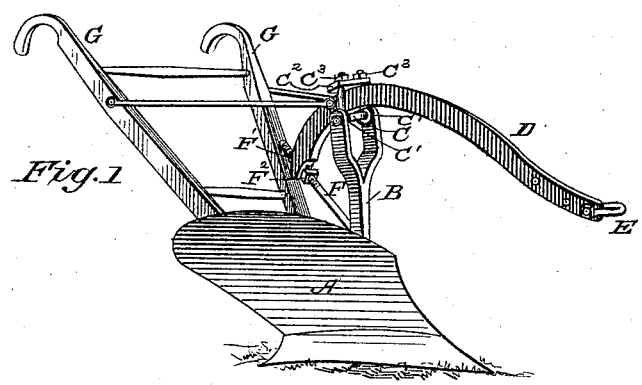
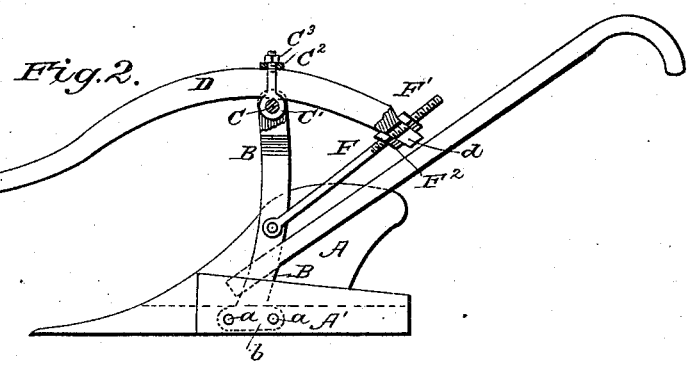
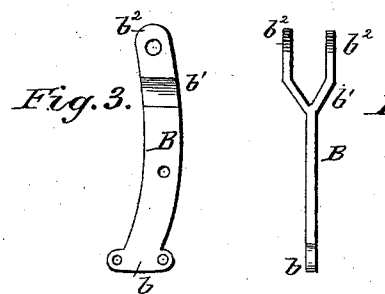 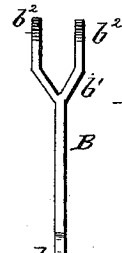
WITNESSES:
Fred G. Dieterich
John E. Kemon
INVENTOR:
Geo Wolverton
BY Munn & Co
ATTORNEYS.

United States Patent Office.

GEORGE WOLVERTON, OF CHARLES CITY, IOWA, ASSIGNOR OF ONE-HALF TO BENJAMIN TYLEY BAILEY, OF SAME PLACE.

PLOW.

SPECIFICATION forming part of Letters Patent No. 371,908, dated October 18, 1887.

Application filed August 3, 1887. Serial No. 246,082. (No model.)

*To all whom it may concern:*

Be it known that I, GEORGE WOLVERTON, of Charles City, in the county of Floyd and State of Iowa, have invented a new and useful Improvement in Plows, of which the following is a specification.

The object of my invention is to provide an improvement in the class of plows whose beams are pivotally secured to the standard and adapted for adjustment vertically to vary the depth of the furrow; and the improvement consists in certain constructions and combinations of parts hereinafter described, and particularly designated in the claim.

In the accompanying drawings, Figure 1 is a perspective of a plow embodying my invention; Fig. 2, a side elevation of the landside thereof, and Figs. 3 and 4 details in elevation of the plow-standard.

The landside $A'$ of a plow, A, of any well-known or preferred construction is secured by bolts $a$ $a$ to the foot $b$ of a standard, B. The upper end, $b'$, of the standard has branching arms $b^2$ to receive a bolt, C, which passes through eyebolts $C'$ upon opposite sides of the plow-beam D. The beam D rests upon the bolt C, and is held securely thereon by a clamping-plate, $C^2$, and nuts $C^3$, fitted upon the upper screw-threaded ends of the bolts $C'$. A simple ring-clevis, E, is pivoted to the forward end of the beam, and a stud, $d$, is formed in the rear end thereof, through which passes the upper end of a brace-rod, F. The rod F is screw-threaded upon its upper end, and is fitted with screw-nuts $F'$ $F^2$, respectively located above and below the said beam for adjusting it and thus regulating the depth of the plowing. The beam rocks upon the upper end of the standard, and its forward end is raised and lowered by the nuts upon the screw-threaded ends of the brace, by which means the ordinary adjustable clevis is dispensed with.

The plow is provided with handles G, and may be easily handled. It may be easily taken to pieces or put together, and is light, strong, and inexpensive. The draft of the plow is always kept central, will run light, and may be worked with one, two, or three horses.

I claim as my invention and desire to secure by Letters Patent—

The combination, with a plow, A, of the standard B, forked at its upper end, bolt C, eyebolts $C'$, clamping-plate $C^2$, beam D, and brace-rod F, substantially as described, for the purpose specified.

GEO. WOLVERTON.

Witnesses:
 JOSIAH BILLINGS,
 J. P. AUSTIN.